United States Patent
Hou et al.

(10) Patent No.: US 11,344,818 B2
(45) Date of Patent: May 31, 2022

(54) COMPUTER SYSTEM, GAME LOADING METHOD THEREOF AND COMPUTER READABLE STORAGE MEDIUM

(71) Applicant: Acer Incorporated, New Taipei (TW)

(72) Inventors: Guan-Yu Hou, New Taipei (TW); Tz-Yu Fu, New Taipei (TW); Wei-Kuo Shih, New Taipei (TW)

(73) Assignee: Acer Incorporated, New Taipei (TW)

( * ) Notice: Subject to any disclaimer, the term of this patent is extended or adjusted under 35 U.S.C. 154(b) by 240 days.

(21) Appl. No.: 16/396,745

(22) Filed: Apr. 28, 2019

(65) Prior Publication Data

US 2020/0108322 A1 Apr. 9, 2020

(30) Foreign Application Priority Data

Oct. 4, 2018 (TW) .................................. 107135015

(51) Int. Cl.
*A63F 13/95* (2014.01)
*A63F 13/493* (2014.01)
*A63F 13/48* (2014.01)

(52) U.S. Cl.
CPC .............. *A63F 13/95* (2014.09); *A63F 13/48* (2014.09); *A63F 13/493* (2014.09)

(58) Field of Classification Search
CPC ......... A63F 13/48; A63F 13/95; A63F 13/493
USPC .......................................................... 463/43
See application file for complete search history.

(56) References Cited

U.S. PATENT DOCUMENTS

| 9,268,692 | B1* | 2/2016 | Wehman | G06F 16/10 |
|---|---|---|---|---|
| 2007/0094178 | A1* | 4/2007 | Shin | G06F 21/55 |
| | | | | 706/20 |
| 2012/0192171 | A1* | 7/2012 | Tanaka | A63F 13/77 |
| | | | | 717/168 |
| 2015/0283456 | A1* | 10/2015 | Chan | H04L 65/4007 |
| | | | | 463/43 |

(Continued)

FOREIGN PATENT DOCUMENTS

| CN | 106844740 | 6/2017 |
|---|---|---|
| TW | 201508483 | 3/2015 |

(Continued)

OTHER PUBLICATIONS

PCDIY, "Intel Optane Memory, Useful System Accelerating Tool, Compatible Only with Motherboards of 200 series, KabyLake Processors of the 7th Generation, and Windows 10 System", Apr. 30, 2017, Available at: "http://leo160918.pixnet.net/blog/post/306138751-%E3%80%90%E9%9B%BB%E8%85%A6%E9%9B%B6%E4%BB%B6%E9%80%9A%E5%A0%B1%E3%80%91intel-optane-memory%EF%BC%8C%E7%B3%BB%E7%B5%B1%E5%8A%A0%E9%80%9F".

*Primary Examiner* — Kang Hu
*Assistant Examiner* — Wei Lee
(74) *Attorney, Agent, or Firm* — JCIPRNET

(57) ABSTRACT

A computer system, a game loading method thereof and a computer readable storage medium are provided. The computer system includes a first storage, a second storage and a processor. The first storage stores multiple game files of a game. The access rate of the second storage is faster than the first storage. The processor is coupled to the first and second storages. The processor performs the game, stores corresponding game files in the first storage into the second storage according to process of the game, and access the game files stored in the second storage to continue progress (Continued)

of the game. Accordingly, loading time of game scene can be reduced, so as to improve gaming experience.

11 Claims, 3 Drawing Sheets

(56) References Cited

U.S. PATENT DOCUMENTS

| | | | |
|---|---|---|---|
| 2018/0136838 A1 | 5/2018 | White et al. | |
| 2018/0165207 A1 | 6/2018 | Yigzaw et al. | |
| 2018/0293173 A1* | 10/2018 | Zhu | G06F 12/0811 |
| 2019/0046880 A1* | 2/2019 | Okamura | G06F 12/023 |

FOREIGN PATENT DOCUMENTS

| | | |
|---|---|---|
| TW | 201818250 | 5/2018 |
| WO | 2015051711 | 4/2015 |

* cited by examiner

COMPUTER SYSTEM, GAME LOADING METHOD THEREOF AND COMPUTER READABLE STORAGE MEDIUM

CROSS-REFERENCE TO RELATED APPLICATION

This application claims the priority benefit of Taiwan application serial no. 107135015, filed on Oct. 4, 2018. The entirety of the above-mentioned patent application is hereby incorporated by reference herein and made a part of this specification.

BACKGROUND OF THE DISCLOSURE

Field of the Disclosure

The disclosure relates to a memory access technology for games, and more particularly to a computer system, a game loading method thereof, and a computer readable storage medium.

Description of Related Art

For game players, the most perceivable user experience during a game is the smoothness (such as Frame Per Second (FPS)) of the game frame and loading time of game progress (e.g., scene, level). Table (1) shows evaluation that are provided through high-end e-sports platforms on the influence of different storage devices (the storage devices in this experiment are Hard Disk Drive (HDD), Solid-State Drive (SSD) (i.e., NAND media) with Serial Advanced Technology Attachment (SATA) interface, Non-Volatile Memory Express (NVMe) (i.e., NAND media) with Peripheral Component Interconnect Express (PCIe) interface, Intel 900p (3D Xpoint media), Random Access Memory (RAM) disk (i.e., Dynamic Random Access Memory (DRAM) media)) on game experience. From the experimental results, it can be concluded that different storage devices have little influence on the benchmark of the game and the average FPS. It can be seen that the storage device is not the key point that affects the above two factors. However, the loading time of game scene varies along with storage devices having different performances. Undoubtedly, hard drive has the worst performance (the longest loading time) in terms of the scene loading time, followed by the NAND-based SSD. The NVMe with PCIe is a more powerful controller with PCIe protocol (higher bandwidth), which makes it have better scene loading performance than SSD with SATA. Next, a storage device with better performance is 3D Xpoint and RAM Disk using higher speed access media. It can be seen that the responding time of the (storage) media will be the most critical factor affecting the scene loading time. The response time and the scene loading time grow linearly.

FIG. 1 is a hardware structure of a conventional computer system. Based on the results of Table (1), the following conclusions can be obtained. (1) FPS represents the real-time frame number performance of game: Since game scenes move fast, the number of frames required to be output per second is quite large, and it is necessary to use the media with high-access rate as a medium to bear the output of multiple images at a time. Therefore, the image memory (for example, Video Random Access Memory (VRAM)) and graphic chips (for example, System on a Chip (SoC)) used by graphic cards are the key factors that affect FPS output. (2) Game scene loading time: As mentioned in point (1), a large number of images required for the game in a short time are output to the display through the image memory, but it takes a period of game loading time to enter each scene. During the time period, the game extracts the material needed for the next game level from the terminal storage device, and the extracted material is temporarily stored in the system memory for the image memory to perform data exchange in real time. (3) Game benchmark score: Basically, this value is less objective, which is because the calculation weights of each benchmark score are not the same, and the results of this experiment show that the scene loading time almost has no effect on the game benchmark software. Therefore, this value can be more objective when comparing the performance of different platforms. Accordingly, if the loading time of game scene can be shortened, it will help to enhance the user's gaming experience.

SUMMARY OF THE DISCLOSURE

In view of the above, the disclosure provides a computer system, a game loading method thereof, and a computer readable storage medium, which temporarily store game file into a media with high access rate to improve the access rate of the game file, thereby reducing the loading time of game scene.

The computer system of the disclosure includes a first storage, a second storage, and a processor. The first storage is configured to store several game file of the game. The access rate of the second storage is faster than the first storage. The processor is coupled to the first storage and the second storage. The processor executes the game, stores the corresponding game file in the first storage into the second storage according to the progress of the game, and accesses the game file stored in the second storage to continue the game progress of the game.

The game loading method of the disclosure is adapted for a computer system. This computer system includes a first storage, the first storage stores several file of the game. The game loading method includes the following steps. A second storage is provided with a faster access rate than the first

TABLE 1

| | Storage device | | | | |
|---|---|---|---|---|---|
| | RAM DISK | 3D Xpoint | PCIe NVMe | SATA SSD | HDD |
| Read bandwidth | 7200 MB/S | 2700 MB/S | 3200 MB/S | 520 MB/S | 130 MB/S |
| Response time | 3.2 μs | 14.4 μs | 76.6 μs | 162 μs | 7.8 ms |
| Benchmark score | 15,328 | 15,193 | 15,455 | 15,278 | 15,078 |
| Average FPS | 114.941 | 114.024 | 115.847 | 114.82 | 112.847 |
| Total scene loading time | 13.899 seconds | 14.383 seconds | 16.567 seconds | 21.639 seconds | 41.914 seconds |
| Difference as compared to RAM DISK | | 3.5% | 19.2% | 55.7% | 201.5% | storage. The game is executed. The corresponding game file in the first storage are stored into the second storage according to the progress of the game. The game file stored in the second storage are accessed to continue the progress of the game.

The computer readable storage medium of the disclosure records computer program to be loaded by a processor of a computer system, to execute the following steps. In response to the execution of the game stored in the first storage of the computer system, the corresponding game file in the first storage is stored into the second storage according to the progress of the game, and the access rate of the second storage is faster than the first storage. The game file stored in the second storage is accessed to continue the progress of the game.

Based on the above, the computer system, the game loading method thereof and the computer readable storage medium of the embodiment of the disclosure temporarily store the corresponding game file into another storage with a faster access rate based on the progress of the game. By loading game file (e.g., game material or other game-related files) into another storage with faster access rate, the game scene loading time may be effectively improved relative to original storage, thereby enhancing the gaming experience.

In order to make the aforementioned features and advantages of the disclosure more comprehensible, embodiments accompanying figures are described in detail below.

DESCRIPTION OF EMBODIMENTS

Figure 1:
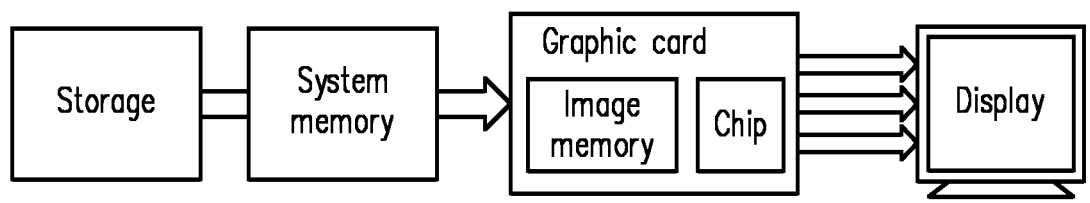
FIG. 1 is a hardware structure of a conventional computer system.
Figure 2:
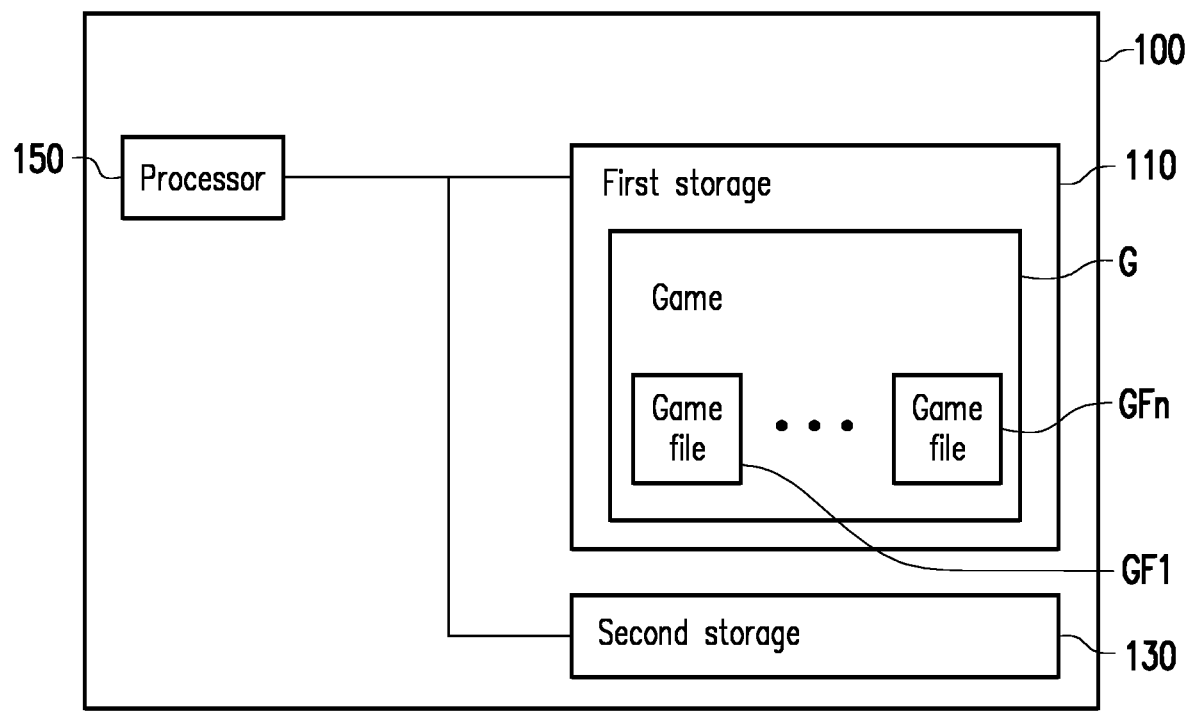
FIG. 2 is a block diagram of components of a computer system according to an embodiment of the disclosure.

FIG. 2 is a block diagram of components of a computer system 100 according to an embodiment of the disclosure. Referring to FIG. 2, a computer system 100 may be an electronic device such as a desktop computer, a notebook computer, a server, or an all-in-one (MO). The computer system 100 includes at least but not limited to a first storage 110, a second storage 130, and a processor 150.

The first storage 110 may be any type of fixed or removable random access memory (RAM), a flash memory, a hard disk drive (HDD), a solid-state disk (SSD), other non-volatile memory (e.g., memories having non-volatile storage characteristics such as NVMe, Storage Class Memory (SCM), persistent memory, 3D Xpoint memory, a magnetoresistive random access memory (MRAM)) or a similar component or a storage with the combination of the above components. In this embodiment, the first storage 110 is configured to store buffered or permanent data, software modules, operating systems, applications, drivers, game files GF1~GFn of the game G (n is a positive integer, each game file GF1~GFn of the embodiment may be a collection of files of a level or a scene, or at least one file) (for example, game material, or other game related files (film, music, template, etc.)) or the like, the details are to be described in detail in the subsequent embodiments.

Reference to the implementation of the second storage 130 may be derived from the description of the first storage 110, and are not be described herein. It should be noted that the second storage 130 of the embodiment of the disclosure has a faster access rate than the first storage 110. For example, the first storage 110 is a hard drive and second storage 130 is an SSD. Alternatively, the first storage 110 is an SSD and the second storage 130 is a 3D Xpoint memory. The type of the first storage 110 and the second storage 130 may be adjusted by the user according to actual needs, and the disclosure provides no limitation in this regard. The second storage 130 may also be used to store buffered or permanent data, software modules, applications, drivers, operating systems and other data or files, and is stored in the game files GF1~GFn of the Game G The detailed operation contents are to be described in the subsequent embodiment.

The processor 150 is coupled to the first storage 110 and the second storage 130, and may be a central processing unit (CPU), or other programmable general-purpose or specific-purpose microprocessor, a digital signal processor (DSP), a programmable controller, an application specific integrated circuit (ASIC) or other similar components or a combination of the above. In the embodiment of the disclosure, the processor 150 is configured to execute all the operations of the computer system 100, and can load and execute the software modules, drivers, files, and data recorded by the first and second storages 110 and 130. For example, the processor 150 accesses game file GF1 for loading into system memory.

In order to facilitate the understanding of the operation flow of the embodiment of the disclosure, the loading process of the game system 100 for the game G in the embodiment of the disclosure is described in details below. Hereinafter, the method described in the embodiments of the disclosure is described with various components and modules of the computer system 100. The various processes of the method may be adjusted according to the actual implementation, and the disclosure provides no limitation in this regard.

Figure 3:
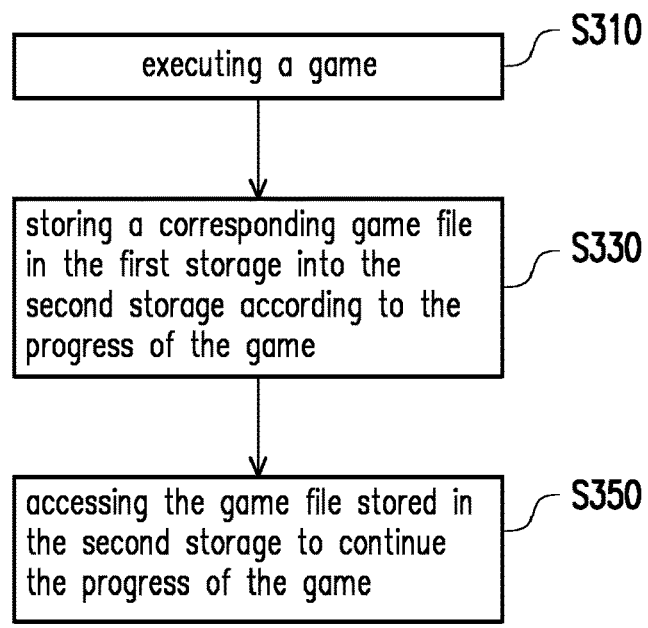
FIG. 3 is a flow chart illustrating a game loading method according to an embodiment of the disclosure.

FIG. 3 is a flow chart illustrating a game loading method according to an embodiment of the disclosure. Referring to FIG. 3, in response to the user performing an opening operation on the application of the game G through an input device (for example, a mouse, a keyboard, a touch panel, etc.) of the computer system 100, the processor 150 executes the game G (step S310). For example, the user clicks on the mouse to select the shortcut of the game G on the desktop. Alternatively, the user presses a button on the keyboard that is preset to quickly open the game G.

The processor 150 stores the corresponding game file in the first storage 110 into the second storage 130 according to the progress of the game (step S330). Specifically, the experimental results of Table (1) show that the scene loading time is associated with the responding time of the storage device (that is, associated with the access rate and the interface bandwidth). If the game files GF1~GFn are accessed by the storage device with faster access rate, the game files GF1~GFn required for the scene or the level can be loaded faster than the storage device with slower access rate. In addition, although all the game files GF1~GFn of a certain game G can be temporarily stored in the storage device with faster access rate, given that the total file size of the game G is quite large and the storage capacity of the storage device having faster access rate is generally smaller, it is necessary to make good use of the storage space of the storage device.

Based on the foregoing technical concept, the processor 150 reads the game archive record of the game G to obtain the user's game progress, and the game files GF1, GF2 . . . and/or GFn of the current game stage corresponding to the game archive record stored by the first storage 110 are stored into the second storage 130 according to the remaining space in the second storage 130. The progress of the game may be the number of levels, the percentage of completion, the last recorded location, the last recorded time, and so on. The processor 150 first finds the game material corresponding to the game progress or the file or folder path of the related files (i.e., game files GF1, GF2 . . . and/or GFn), and compares whether the game files GF1, GF2 . . . and/or GFn of the current game stage exceeds the remaining space in the second storage 130. If the file size does not exceed the remaining space, the processor 150 copies the game files GF1, GF2 . . . and/or GFn from the first storage 110 into the second storage 130, and further evaluates whether there is still remaining space left for the game files GF1, GF2 . . . and/or GFn in the subsequence game stage to be pre-stored in the second storage 130. This subsequent game stage follows the current game stage. For example, if the current game stage is the third level, and the subsequent game stage is the 4th and 5th levels (the number of subsequent game stages may vary depending on the need or the remaining space). On the other hand, if the file size exceeds the remaining space, the processor 150 copies the game files GF1, GF2, . . . and/or GFn that are important/necessary/loaded with high priority into the second storage 130 first.

Next, the processor 150 accesses the game files GF1, GF2, . . . and/or GFn stored in the second storage 130 to continue the progress of the game G (step S350). Specifically, in general, in response to the execution of the game the processor 150 loading the corresponding game files GF1, GF2, . . . and/or GFn from the first storage 110 into the system memory. In the embodiment of the disclosure, the processor 150 has temporarily stored the game files GF1, GF2, . . . and/or GFn corresponding to the game progress into the second storage 130, so the processor 150 may be changed to directly load the corresponding game files GF1, GF2 . . . and/or GFn from the second storage 130 to speed up loading of these game files GF1, GF2 . . . and/or GFn.

It should be noted that, in order to effectively utilize the storage space, the embodiment of the disclosure adopts the concept of loop recording to file management. In response to the end of the current game stage or part of the game files GF1, GF2 . . . and/or GFn have been loaded, the processor 150 may access the game files GF1, GF2, . . . and/or GFn that have not been loaded in the subsequent game stage or the current game stage from the second storage 130, and deletes the game files GF1, GF2 . . . and/or GFn that have been loaded or completed in the current game stage from the second storage 130. In this manner, the second storage 130 has the space to continuously store the game files GF1, GF2, . . . and/or GFn of other game stages.

It should be noted that the foregoing embodiment is about the loading behavior in the activation stage of the game and during the execution of the game the processor 150 continuously monitors the progress of the game and determines the game stage that the game G is likely to be or will perform in the future. For example, processor 150 reads an automatically stored game archive or detects a current level or scene. The processor 150 may pre-store the game files GF1, GF2, . . . and/or GFn corresponding to the game stages that are likely to be or will be performed in the future into the second storage 130 according to the remaining space of the second storage 130. Then, the processor 150 may access the game files GF1, GF2, . . . and/or GFn pre-stored in the second storage 130 to continue the game progress.

Figure 4:
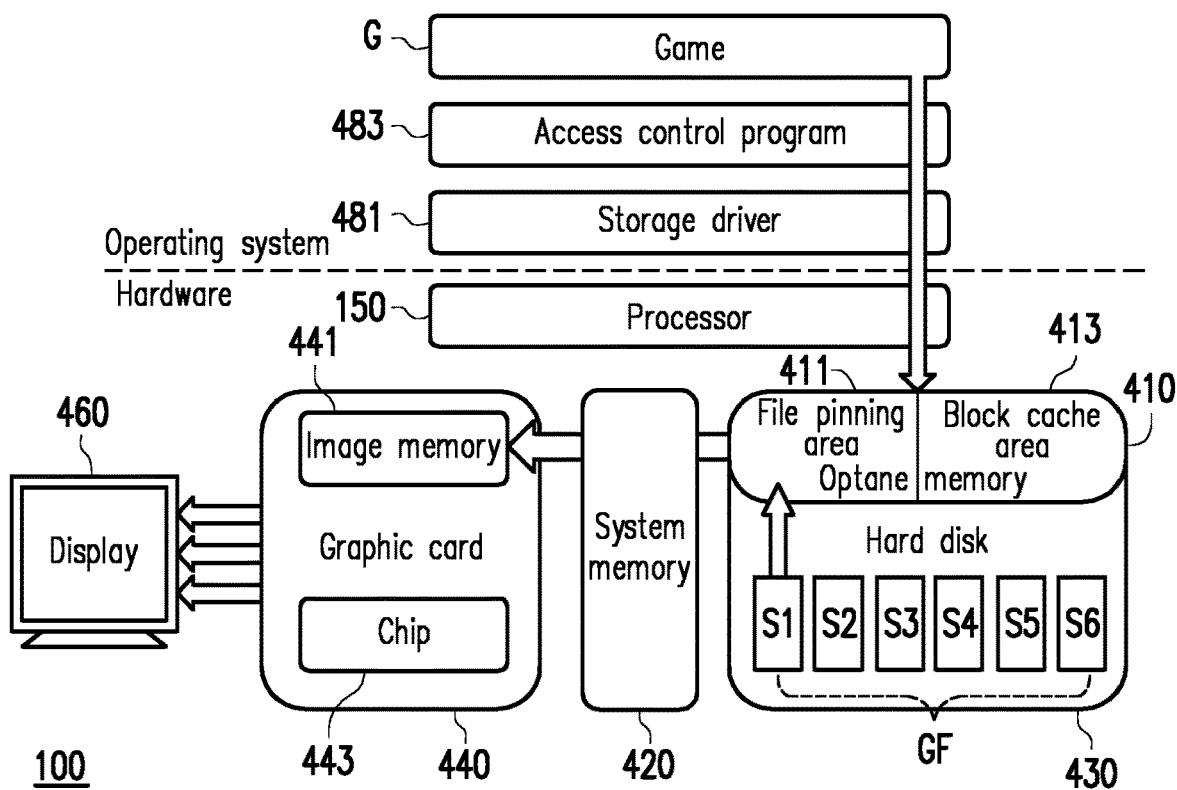
FIG. 4 is a system structure diagram of a computer system according to an embodiment of the disclosure.

In order to make the spirit of the disclosure more comprehensible, another embodiment is provided below. FIG. 4 is a system structure diagram of a computer system 100 according to an embodiment of the disclosure. Referring to FIG. 4, the computer system 100 further includes a system memory 420 (for example, DRAM), a graphic card 440 (no limitation is provided to the transmission interface) and a display 460 (for example, an LCD, an LED display, an OLED display, etc.). In the exemplary embodiment, the first storage 110 is a hard disk 430 and the second storage 130 is an Optane memory 410.

The Optane memory 410 uses 3D Xpoint as the transmission medium, and its responding time is quite close to DRAM, and is a high-speed storage medium. The function of the Optane memory 410 in the computer system 100 is similar to cache. The Optane memory 410 may be used to accelerate the slower hard disk 430, so that the computer system 100 equipped with the hard disk 430 can also have the same performance as SSD. As long as the file of computer system 100 is temporarily stored by the Optane memory 410, its excellent responding performance will effectively enhance the user experience.

The acceleration method of the Optane memory 410 may include Block Cache, Top Accessed Content, and User Pinned Files methods. Among them, the block cache uses the algorithm of the Optane memory 410 to calculate the user's habits of use (for example, hit rate), and temporarily stores the data that the algorithm thinks is important to the user. The top accessed content is the system file (for example, Hiberfil for boot of Windows system, System Pagefile, etc.) that the Optane algorithm has preset to speed up. The user pinned files mean that the files (which may be the application or the folder path) that need to be accelerated are pinned according to the needs, so that the user can feel the acceleration by 100% when the file is loaded for the first time (as compared to block cache, the same feeling may be obtained when the file has been loaded for more than twice).

Figure 5:
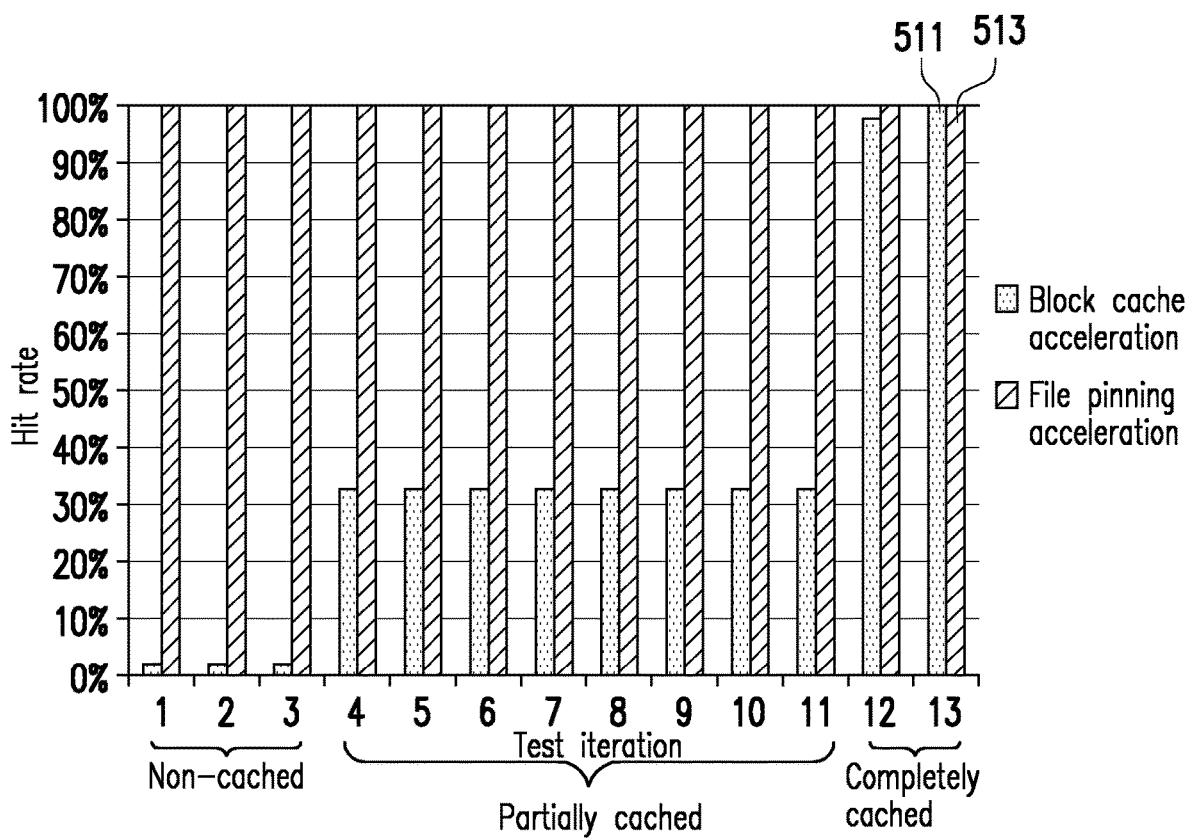
FIG. 5 illustrates a comparison between block cache and pinning acceleration.

FIG. 5 illustrates a comparison between block cache and pinning acceleration. Referring to FIG. 5, since the block cache function needs to calculate the hit rate of the file used by the user through the algorithm, the file will not be immediately accelerated by 100% (the file will not be completely temporarily stored into the Optane memory 410). Using the block cache acceleration 511 will need to wait until the game is executed for the 13th time to achieve 100% acceleration, and the pinning acceleration 513 achieves 100% acceleration when the game is run for the first time (i.e., the designated file is immediately and completely stored into Optane memory 410 temporarily). The experiment in FIG. 5 shows that 100% acceleration is achieved when the file is opened 13 times in a row, which is completely unsuitable for general user behavior (general user behavior should also involve other scenarios of use, such as Internet browsing, word processing, etc.). In addition, Table (2) shows the difference between the file pinning and the block cache with respect to the total scene loading time, and the loading time of file pinning is quite close to RAM DISK. It can be seen that if the user pinning function can be effectively utilized to speed up the files that actually need to be accelerated for the user, a better user experience can be achieved.

TABLE 2

| | Storage device | | | |
|---|---|---|---|---|
| | RAM DISK | HDD + Optane memory 64 GB (File pinning) | HDD + Optane memory 32 GB (File pinning) | HDD Optane memory 32 GB (block cache) |
| Read bandwidth | 7200 MB/S | 1500 MB/S | 1500 MB/S | 1500 MB/S |
| Responding time | 3.2 μs | 14.4 μs | 14.4 μs | 14.4 μs |
| Game benchmark | 2,089 | 2,086 | 2,088 | 2,098 |
| Average FPS | 13.76 | 13.76 | 13.76 | 13.77 |
| Total scene loading time | 21.15 seconds | 21.42 seconds | 21.44 seconds | 42.81 seconds |
| Difference as compared to RAM DISK | | 1.3% | 1.4% | 102% |

In addition, since today's large games are 40 or 50 GB or more, the size of the Optane memory 410 sold on the market is only 16 GB/32 GB/64 GB, and the storage space of the Optane memory 410 is at least divided into the file pinning area 411 and the block cache area 413 for performing the user pinned file function and the block cache function respectively. Finally, the space (i.e., file pinning area 411) in the Optane memory 410 available for file pinning is approximately only a quarter of the full capacity, which might not be enough to speed up the files of the whole game.

The embodiment of the disclosure focuses on how to speed up all the game files GF, so that the user can have a 100% acceleration effect in the process of executing the game G Returning to FIG. 4, the processor 150 may operate an access control program 483 in the background or foreground to read the game archive record of the game and find the file path or folder path of the game file GF (e.g., material) corresponding to the progress of the game. By using a storage driver 481, the processor 150 then pre-pins the file path or the folder path of the game file GF (e.g., current level S2) in the current game stage corresponding to the game record file and the game file GF (e.g., next level S3 or the following next level S4, and adjusted according to the remaining space in the file pinning area 411) in the subsequent game stage (or might be encountered later) to the file pinning area 411 according to the remaining space of the file pinning area 411, thereby storing the game file GF corresponding to the game progress to the file pinning area 411.

After the current game stage is ended (for example, currently level is passed), the processor 150 may delete the game file GF that has been finished/completed/overcome from the file pinning area 411, and pin the game file GF required for the subsequent game stage to the file pinning area 411. In this way, it is possible to overcome the limitation of limited space in the file pinning area 411, and effectively use the file pinning area 411, so that the user can obtain 100% acceleration during the game.

Another embodiment of the disclosure provides a non-transitory computer readable recording medium, which records computer program to be loaded into a processor to execute the steps (the embodiments shown in FIG. 3 to FIG. 5) of the above game loading method. The computer program includes a plurality of program instructions (e.g. an organization chart, establishing program instruction, a table approving program instruction, a setting program instruction, and a deployment program instruction), and after the processor 150 in the computer system 100 loads and executes the program instructions, the above game loading method can be completed and the function of the computer system 100 can be accomplished.

In summary, the computer system, the game loading method, and the non-transitory computer readable storage medium in the embodiments of the disclosure pre-accelerate (the game file is temporarily stored into a storage with a higher access rate) the data (level) (the data might be images, music, templates and so on required for levels) that is likely to be encountered subsequently for the user by detecting the progress of the game executed by the user. In addition, the embodiments of the disclosure further delete the game material that has been passed by the user, so as to free up enough space to place the file that needs to be accelerated later. In this way, the game scene loading time may be effectively improved, thereby enhancing the user's gaming experience.

Although the disclosure has been disclosed by the above embodiments, the embodiments are not intended to limit the disclosure. It will be apparent to those skilled in the art that various modifications and variations can be made to the structure of the disclosure without departing from the scope or spirit of the disclosure. Therefore, the protecting range of the disclosure falls in the appended claims.

What is claimed is:

1. A computer system, comprising:
a first storage, storing a plurality of game files of a game;
a second storage, having a faster access rate than the first storage, wherein the second storage is a 3D Xpoint memory, and the 3D Xpoint memory is configured with a file pinning area; and
a processor, coupled to the first storage and the second storage, wherein the processor is configured to:
execute the game,
pin a file path or a folder path of each of a plurality of game files corresponding to a current game stage and a subsequent game stage in the first storage, thereby storing the game files corresponding to a game progress of the game into the file pinning area according to a remaining space of the file pinning area, wherein the subsequent game stage is after the current game stage,
access the game file of the current game stage stored in the file pinning area to continue the game progress, and
in response to an end of the current game stage, access the game file of the subsequent game stage from the second storage and delete the game file of the current game stage from the second storage.

2. The computer system according to claim 1, wherein the processor reads a game archive record of the game to obtain the game progress.

3. The computer system according to claim 1, wherein the processor compares whether the game file in the subsequent game stage exceeds the remaining space of the file pinning area after the game file in the current game stage is stored in the file pinning area.

4. The computer system according to claim 1, wherein the 3D Xpoint memory is an Optane memory.

5. A game loading method, adapted for a computer system, wherein the computer system comprises a first storage, the first storage stores a plurality of game files of a game, and the game loading method comprises:
providing a second storage, wherein the second storage has an access rate faster than the first storage, the second storage is a 3D Xpoint memory, and the 3D Xpoint memory is configured with a file pinning area;
executing the game;
pinning a file path or a folder path of each of a plurality of game files corresponding to a current game stage and a subsequent game stage in the first storage, thereby storing the game files corresponding to a game progress of the game into the file pinning area according to a remaining space of the file pinning area, wherein the subsequent game stage is after the current game stage;
accessing the game file of the current game stage stored in the file pinning area to continue the game progress of; and
in response to an end of the current game stage, accessing the game file of the subsequent game stage from the second storage and deleting the game file of the current game stage from the second storage.

6. The game loading method according to claim 5, wherein after executing the game, the game loading method further comprises:
reading a game archive record of the game to obtain the game progress.

7. The game loading method according to claim 5, wherein before storing the game file in the subsequent game stage, the game loading method further comprises:
comparing whether the game file in the subsequent game stage exceeds the remaining space of the file pinning area after the game file in the current game stage is stored in the file pinning area.

8. The game loading method according to claim 5, wherein the 3D Xpoint memory is an Optane memory.

9. A non-transitory computer readable storage medium, recording computer program to be loaded by a processor of a computer system to execute steps of:
in response to execution of a game stored in a first storage of the computer system, pinning a file path or a folder path of each of a plurality of game files corresponding to a current game stage and a subsequent game stage in the first storage, thereby storing the game files corresponding to a game progress of the game into a file pinning area configured in a second storage according to a remaining space of the file pinning area, wherein the second storage has an access rate faster than the first storage, the second storage is a 3D Xpoint memory, the 3D Xpoint memory is configured with the file pinning area, and the subsequent game stage is after the current game stage;
accessing the game file of the current game stage stored in the file pinning area to continue the game progress; and
in response to an end of the current game stage, accessing the game file of the subsequent game stage from the second storage and deleting the game file of the current game stage from the second storage.

10. The non-transitory computer readable storage medium according to claim 9, wherein the computer program further comprises steps of:
reading a game archive record of the game to obtain the progress of the game.

11. The non-transitory computer readable storage medium according to claim 9, wherein the computer program further comprises steps of:
comparing whether the game file in the subsequent game stage exceeds the remaining space of the file pinning area after the game file in the current game stage is stored in the file pinning area.

* * * * *